United States Patent [19] [11] Patent Number: 6,157,553
Kranister et al. [45] Date of Patent: Dec. 5, 2000

[54] SYSTEM FOR MAINTAINING ELECTRIC POWER DURING A MOMENTARY POWER INTERRUPTION

[75] Inventors: Andreas Kranister, Wilhelmsburg; Harald Schweigert, Vienna, both of Austria

[73] Assignee: Siemens Aktiengesellschaft Osterreich, Vienna, Austria

[21] Appl. No.: 09/450,914
[22] Filed: Nov. 29, 1999

Related U.S. Application Data

[63] Continuation of application No. PCT/AT98/00087, Apr. 2, 1998.

[30] Foreign Application Priority Data

May 30, 1997 [AT] Austria ..................................... a928/97

[51] Int. Cl.[7] ................................................. H02M 1/12
[52] U.S. Cl. ............................................ 363/44; 307/66
[58] Field of Search ................................... 363/44, 45, 46, 363/47, 48, 34, 35, 36, 37, 50, 52, 53, 49; 307/64, 65, 43, 44, 45, 46, 66

[56] References Cited

U.S. PATENT DOCUMENTS

| 4,897,631 | 1/1990 | Jundt et al. |
| 5,796,182 | 8/1998 | Martin ........................................ 307/66 |
| 5,828,207 | 10/1998 | Saadeh ..................................... 323/281 |

FOREIGN PATENT DOCUMENTS

| 0 316 781 | 11/1987 | European Pat. Off. . |
| 2 558 654 | 1/1984 | France . |
| 36 16 189 | 4/1987 | Germany . |
| 2 192 504 | 6/1987 | United Kingdom . |

*Primary Examiner*—Shawn Riley
*Assistant Examiner*—Gary L. Laxton
*Attorney, Agent, or Firm*—Thomas R. Vigil

[57] ABSTRACT

A mains power supply for supplying an electricity consumer connected directly or via a converter to an unstabilised direct current branch of the mains power supply, having a buffer capacitor which can be charged from the direct current branch and which also supplies the direct current branch for a predetermined minimum period of time in the event of a mains power failure or interruption in power, and wherein the buffer capacitor (C) is connected via a high impedance charge resistance (R) at the voltage (U1) of the direct current branch, a voltage limiting means ($D_z$) is connected in parallel with the buffer capacitor (C) and limits the voltage at the capacitor substantially to the minimum voltage ($U_M$) of the direct current branch which is to be expected in the normal operation, wherein one diode (D) is connected in parallel with the charge resistance and serves to supply the electricity consumer from the buffer capacitor in the event that the input direct current voltage falls below the minimum voltage ($U_M$).

3 Claims, 1 Drawing Sheet

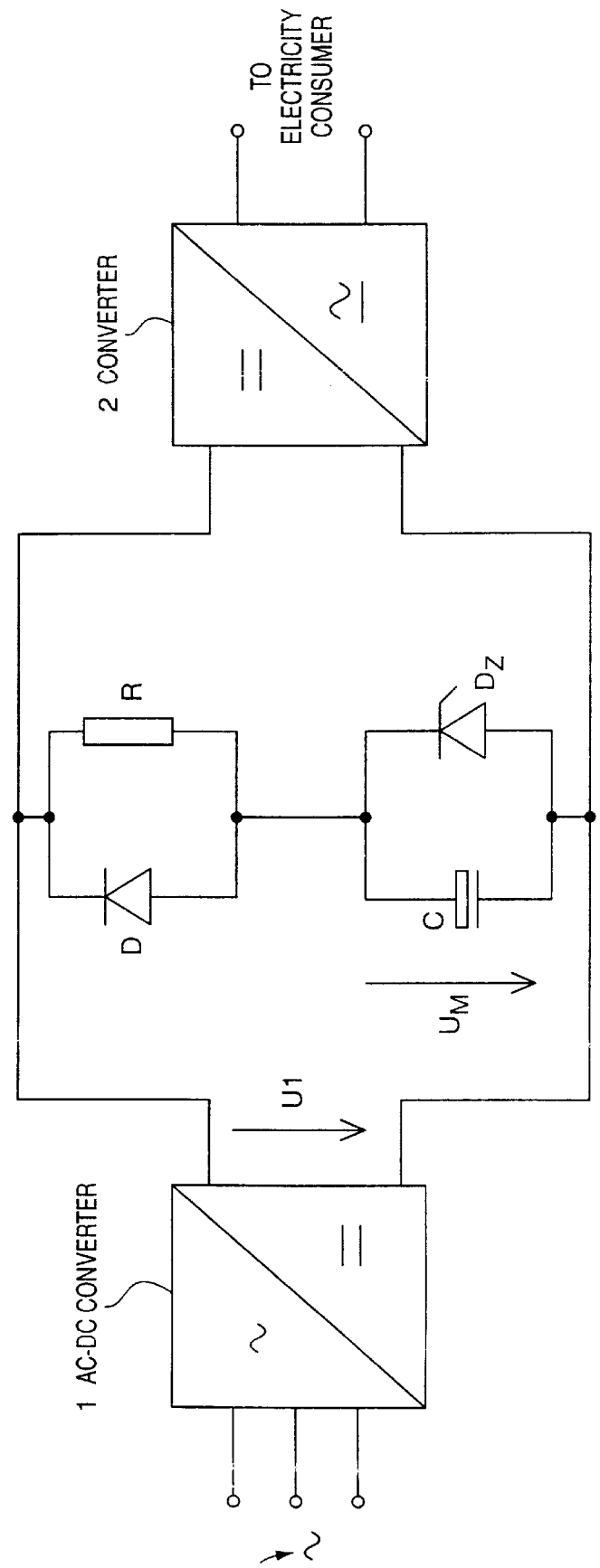

SYSTEM FOR MAINTAINING ELECTRIC POWER DURING A MOMENTARY POWER INTERRUPTION

This application is a continuation of PCT/AT98/00087, filed Apr. 2, 1998.

1. FIELD OF THE INVENTION

A system for maintaining electric power during a momentary power interruption including a power supply for supplying electricity consumer. The power supply is connected directly or to a mains power supply. The mains power supply is connected or A mains power supply for supplying an electricity consumer which is connected directly or via a converter to an unstabilised direct current branch of the mains power supply, having a buffer capacitor which can be charged from the direct current branch and which also supplies the direct current branch for a predetermined minimum period of time in the event of a mains power failure or interruption in power and which is connected via a high impedance charge resistance at the voltage of the direct current branch, wherein one diode is connected in parallel with the charge resistance and serves to supply the electricity consumer from the buffer capacitor in the event that the input direct current voltage falls below the minimum voltage.

2. DESCRIPTION OF THE PRIOR ART SUMMARY OF THE INVENTION

Buffer capacitors are frequently used in conjunction with electrical energy converters, for example, in the case of switched mode mains power supplies which have an intermediate circuit voltage. Buffer capacitors of this type are primarily intended to provide a bridging operation in the event of a brief interruption in the power supply. The dimensioning of the buffer capacitors creates problems if the voltage in the direct current branch is subjected to great fluctuations, as is the case, for example, with mains power supplies which are provided without a converting system for a large mains voltage range. On the one hand, the buffer capacitors need to have a minimum storage energy, as laid down in the respective specification of the mains power supply, to be able to guarantee that a bridge is provided for the duration of the power failure and on the other hand, the buffer capacitors must be dimensioned to the maximum occurring voltage in the direct current branch. At the moment a power failure or an interruption in the mains voltage occurs, the buffer capacitors are often only charged to the intermediate circuit voltage which corresponds to the minimum mains voltage, so that owing to the quadratic dependence of the energy content of a capacitor upon the voltage the energy stored is far less than the amount of energy which corresponds to the maximum voltage in the direct current branch.

Irrespective of the problem with the energy content, when supplying energy from AC mains supplies by virtue of the periodic, pulsating manner in which the capacitors are recharged, serious distortions and a correspondingly high harmonic content can occur in the AC mains supply.

Different solutions are known for eliminating or reducing these problems:

a) The operating range of the electricity consumer (converter) is extended to lower supply voltages, as a result of which the buffer capacitors can be discharged to a lower voltage whilst maintaining the function of the electricity consumer. This solution is encumbered with the disadvantage of high development costs as the limits as to what can be achieved technically are soon achieved, the converter is used inefficiently and the distortions are not taken into consideration.

b) The necessary energy content of the buffer capacity is dimensioned to the minimum supply voltage. This leads on the one hand to the buffer capacitor being considerably over-sized and on the other hand to only a part of the storage capacity being used. Weight, volume and price of the buffer capacitor assume undesirable values and the distortions in the mains power supply are even greater.

c) By pre-switching to a stabilised high-set stage the voltage at the buffer capacitor is maintained at a fixed value irrespective of the fluctuations in the mains power supply. Although this solution, which requires its own switched mode mains power supply stage, solves the two above mentioned problems, it is, however, encumbered with an extremely high expenditure for the development and production and requires a greater amount of space.

Another possibility of eliminating this problem is described in the not previously published patent application A 1328/96 by the applicant, in which the buffer capacitor can be charged via its own charging circuit to a voltage which, irrespective of the voltage fluctuations in the direct current branch, is essentially constant and corresponds substantially to the upper limit value of the direct current voltage, according to which the mains power supply is dimensioned, wherein the buffer capacitor can be switched via a controlled switch to the direct current branch in the event of an undervoltage in the mains or in the direct current branch.

Even though the latter mentioned solution has proven itself in practical use, in some cases it is still too costly, as it requires a voltage supervision circuit, a controlled switch and an additional rectifier diode.

A mains power supply of the type of the subject matter is evident from EP 0 476 431 A2, namely the exemplified embodiment as shown in FIG. 9. In this case, the buffer capacitor, which is connected to an uncontrolled direct current voltage, is generally charged to a higher voltage than the minimum voltage of the direct current branch to be expected in the normal operation. Since a quite specific buffer period must be provided for the electricity consumer, the buffer capacitor must in any case be overdimensioned with respect to its voltage rating, which can have a great effect on the costs and also the installation volume required.

It is the object of the invention to provide a more convenient and cheaper solution for the above mentioned problems which occur in conjunction with buffer capacitors.

This object is achieved with a mains power supply of the type mentioned in the introduction, wherein according to the invention a voltage limiting means is connected in parallel with the buffer capacitor and limits the voltage at the capacitor substantially to the minimum voltage of the direct current branch which is to be expected in the normal operation.

The invention offers the advantage that the buffer time provided by buffer capacitor is a guaranteed minimum period irrespective of the input voltage and that the energy storage capacity of the buffer capacitor is used optimally for each input voltage. It is therefore not necessary to dimension the capacitor to suit the maximum possible voltage of the direct current branch, but rather to dimension it only to suit the minimum direct current voltage expected in the normal operation, which results in considerable savings with respect to the volume, weight and the costs.

In practice, it has proven expedient if the time constant of the RC branch charge resistance-buffer capacitor is in the range from 5 to 30 s. When dimensioning in such a range, the energy losses, the charge resistance and the voltage limiting means are extremely small and on the other hand the buffer capacitor is charged in a sufficiently short time.

It is also advantageous if the voltage limiting means is a Zener diode, as this produces the most convenient and most economic possibility for limiting the voltage.

The invention together with further advantages is explained in detail hereinunder with reference to an exemplified embodiment which is illustrated in the drawing.

BRIEF DESCRIPTION OF THE DRAWING

The single FIGURE of the drawing is a block circuit diagram of a mains power supply including the system for maintaining electric power during a momentary power interruption.

DESCRIPTION OF THE PREFERRED EMBODIMENT(S)

The FIGURE shows a mains power supply, in which a rectifier and input part 1 is connected to three phases of an alternating current mains. The output of the rectifier and the input part 1, which can also contain filters etc. in addition to the rectifiers, is connected to an intermediate circuit direct current voltage U1 which in turn is supplied to a converter 2 whose output is connected to an electricity consumer [not illustrated] or several electricity consumers, for example, computers, logic chips, engines etc. The converter 2 can, for example, convert an intermediate circuit voltage of 450 V to a direct current voltage of 24V. In place of a converter 2, it is also possible to connect an electricity consumer directly to the voltage U1 of the direct current intermediate circuit.

In order to buffer energy in the event of power failures or interruptions in the power supply, a buffer capacitor C is provided but it is not, as would be frequently normal according to the prior art, constantly connected to the intermediate circuit voltage U1. On the contrary, the buffer capacitor C is connected via a high impedance charge resistance R at the voltage U1 of the direct current branch, wherein one Zener diode $D_Z$ is connected in parallel with the buffer capacitor C as a voltage limiting means. The Zener voltage of this diode $D_Z$ is such that the voltage at the capacitor corresponds substantially to the minimum voltage $U_M$ of the direct current branch to be expected in the nornmal operation.

Typical values in the case of a direct current voltage of 450 V are 50 to 2000 μF for the buffer capacitor C and 20 to 300 kOhm for the charge resistance R.

In some cases it can be recommended to use in place of the Zener diode $D_Z$ a different, namely more precise voltage limiting means, for example, a parallel controller with a transistor. Such a parallel controller consists substantially of a transistor of a corresponding voltage rating, a control operation amplifier and a reference voltage. When using reference voltage elements which have tolerances and temperature coefficients which are substantially lower than in the case of conventional Zener diodes, the desired result as far as the invention is concerned can be better achieved. Parallel controllers of this type have been known to the person skilled in the art for some time, likewise the condition that they can be used to achieve an improvement in voltage constant by a factor of approximately 10 with respect to simple Zener diodes.

The charge resistance R is connected in parallel with a diode D which acts as a decoupling diode and is then conductive if the intermediate circuit voltage U1 fails, i.e. falls below the value of the minimum voltage $U_M$. In this situation, a current flows from the buffer capacitor C into the converter 2 or to a consumer, which is supplied with the required bridging energy. The diode D thus prevents energy from flowing out of the capacitor C on the primary side during a power failure or interruption in the power supply.

As it is assumed that power failures or interruptions in the power supply occur only relatively seldom, the buffer capacitor can be charged slowly via the charge resistance to its nominal voltage according to $U_M$, so that it is only necessary to compensate the capacitor leakage currents and to cover the low working current of the Zener diode $D_Z$ via the charge resistance R in the continuous operation. In practice conventional time constants RC lie between 5 and 30 s.

In contrast to buffer capacitors connected directly to the intermediate circuit voltage, the buffer capacitor in a mains power supply in accordance with the invention can be dimensioned to suit the actual energy requirements, i.e., it is not necessary for it to be dimensioned to suit the maximum occurring intermediate circuit voltages and the buffer capacitor also has no effect on the harmonic content of the mains providing the power.

What is claimed is:

1. A mains power supply for supplying electric power to a consumer, said mains power supply being connected by at least two electric wire conductors to an unstabilized direct current branch of the mains power supply, a buffer capacitor (C) being coupled between the at least two wire conductors, said capacitor being charged from the direct current branch and is constructed and arranged to supply the direct current branch for a predetermined minimum period of time in the event of a mains power failure or interruption in power and which is coupled between said at least two electric wire conductors through a high impedance charge resistance (R) at a voltage (U1) of the direct current branch, one diode (D) being connected in parallel with the charge resistance and serves to supply the electric consumer with power from the buffer capacitor in the event that direct voltage supplied from the mains power supply falls below a minimum voltage ($U_M$), characterized in that a voltage limiting device ($D_Z$) is connected in parallel with the buffer capacitor (C) and limits the voltage at the capacitor substantially to the minimum voltage ($U_M$), which is to be expected in normal operation of the mains power supply.

2. Mains power supply according to claim 1, characterized in that the buffer capacitor and the resistance have a time constant of the RC branch comprising charge resistance (R) and the buffer capacitor (C) which lies in the range from, 5 to 30 seconds.

3. Mains power supply according to claim 1, characterised in that the voltage limiting means is a Zener diode ($D_Z$).

* * * * *